US006713529B2

(12) United States Patent
Sime et al.

(10) Patent No.: US 6,713,529 B2
(45) Date of Patent: Mar. 30, 2004

(54) PHASE-CHANGE INK COMPOSITION

(75) Inventors: Kristian John Sime, Duxford (GB);
James Edward Fox, Cambridge (GB);
Alan Lionel Hudd, Nr. Royston (GB)

(73) Assignee: Illinois Tool Works, Inc., Glenview, IL (US)

( * ) Notice: Subject to any disclaimer, the term of this patent is extended or adjusted under 35 U.S.C. 154(b) by 168 days.

(21) Appl. No.: 09/928,077

(22) Filed: Aug. 10, 2001

(65) Prior Publication Data

US 2003/0032696 A1 Feb. 13, 2003

(51) Int. Cl.$^7$ .......................... C09D 11/10; C08L 27/12; C08L 37/00; C08L 61/00
(52) U.S. Cl. ...................... 523/160; 524/505; 524/517; 524/520
(58) Field of Search ............................... 523/160, 161; 106/31.29, 31.61; 524/503, 505, 520, 517

(56) References Cited

U.S. PATENT DOCUMENTS

| | | | |
|---|---|---|---|
| 5,041,161 A | | 8/1991 | Cooke et al. |
| 5,549,929 A | * | 8/1996 | Scheibelhoffer et al. .... 427/282 |
| 5,680,165 A | * | 10/1997 | Takizawa et al. ............. 347/88 |
| 6,093,239 A | * | 7/2000 | Baker et al. .............. 106/31.29 |
| 6,153,667 A | * | 11/2000 | Howald ....................... 523/160 |
| 6,319,310 B1 | * | 11/2001 | Wong et al. .............. 106/31.29 |
| 6,532,870 B1 | * | 3/2003 | Kato et al. ................... 101/465 |

FOREIGN PATENT DOCUMENTS

| | | |
|---|---|---|
| EP | 105994 A1 * | 4/1984 |
| EP | 0 556 649 | 8/1993 |
| EP | 0 805192 | 5/1997 |
| WO | WO 96/10051 | 4/1996 |

* cited by examiner

*Primary Examiner*—Callie Shosho
(74) *Attorney, Agent, or Firm*—Mark W. Croll, Esq.; Donald J. Breh, Esq.; Welsh & Katz, Ltd.

(57) ABSTRACT

A hot-melt ink for use with an ink jet printing apparatus is a liquid at about 100° C. to about 130° C. and solidifies to a two-phase solid having an elastic phase and a crystalline phase. The ink is formulated from a carrier, a first plasticizer, a linear block copolymer, a block copolymer plasticizer, a flow additive and a colorant. The block copolymer plasticizer, in combination with the linear block copolymer forms an elastic phase of the ink upon solidifying. The first plasticizer exhibits sufficiently low viscosity at elevated temperatures to permit ejection of the liquid ink from the printing apparatus. A method for producing indicia is also disclosed.

6 Claims, No Drawings

PHASE-CHANGE INK COMPOSITION

BACKGROUND OF THE INVENTION

The present invention is directed to a phase-change ink composition. More particularly, the present invention is directed to an ink that is a solid at room temperature, a single-phase liquid at a jetting or application temperature and that, upon solidifying, forms an elastic phase and a crystalline phase.

Ink jet inks are well-known in the art and remain a developing technology. These inks are used in a wide variety of applications, varying from home printing application to large scale, high-speed commercial printing operations.

There are two principal types of ink jet inks, namely, liquid inks and solid inks. Current liquid ink technologies focus on aqueous dispersions of various constituents that typically include, at a minimum, a carrier, a colorant or pigment, and one or more polymer-based constituents for providing integrity to the print media These polymer based constituents are generally used to impart desired physical and chemical properties for the final use of the ink. Examples of these polymer-based constituents include binders, thickeners, thixotropic agents, coating aids and the like.

One type of solid ink used in ink jet printing is a hot-melt ink. These inks are typically non-aqueous. In a hot-melt ink or thermal ink process, the ink is melted by a heater in the printing head or device and thus is a liquid at its application or operating temperature. Typically, the vehicle for carrying the dye or colorant has a low critical temperature to facilitate melting and thus use of the solid ink. The ink is heated and melted and subsequently jetted as a "droplet" from the printing apparatus. Upon contact with the printed media the molten ink rapidly solidifies. The ink remains on the surface of the media because of this rapid solidification This provides increased print quality in the form of higher print density and smaller, more regular dot size. It will be recognized that there are many advantages to hot-melt inks. One significant advantage is the decreased potential to spill the ink during handling.

Early hot melt inks were problematic vis-à-vis temperature stability. That is, the dyes in the inks were susceptible to thermal degradation. As such, pigments were adopted for use in favor of dyes. However, problems arose with respect to settling of the pigments or concentration of the pigments at ink-melt boundaries.

Later developments saw the rise of hot-melt vehicles formed of amide compounds. Mixtures of tetra-amide and mono-amide compounds were used, which tetra-amide compounds were formed by reacting ethylene diamene, dimer acid and stearic acid. The mono-amides used were stearamide. Tackifiers were added to promote adhesion to the underlying substrate or media. Anti-oxidants and plasticisers were also known to be used to increase flexibility and lower the melt viscosity.

Further developments saw the use of manipulated polymer cross-linking to achieve the needed phase change without using acidic polymers. It was found that acidic polymers resulted in increased corrosion of the printing apparatus. In one known hot melt ink, a reversible cross-linking material, namely oxyaluminum octotate is mixed with a saturated, long-chain linear alcohol, a pigment, and anti-oxidant, and a corrosion inhibitor.

It has, however, been found that the known hot-melt inks require relative high operating temperatures. That is, the application temperature required for the printing device (i.e., melting the solid ink) is at least about 150° C. In addition, the print formed by currently known hot melt inks do not provide sufficient mechanical strength. That is, the integrity of the printed media may not necessarily meet rigorous standards and specifications for use in commercial applications.

Accordingly, there exists a need for an ink that is a single phase liquid at operating temperature and solidifies upon printing. Desirably, such an ink, upon solidifying, forms two phases, namely, an elastic phase and a crystalline phase. The elastic phase is reinforced by the crystalline phase to provide durable end user properties with high mechanical strength. Such an ink provides high integrity text or printed media Most desirably, such a hot melt ink can be used at temperatures less than about 150° C., and preferably, such inks can be used at jetting or operating temperatures of about 110° C. to about 130° C.

BRIEF SUMMARY OF THE INVENTION

A hot-melt ink for use with an ink jet printing apparatus is a liquid at about 100° C. to about 130° C. and solidifies to a two-phase solid having an elastic phase and a crystalline phase. The ink has a formulation including a carrier, a first plasticizer, a linear block copolymer, a block copolymer plasticizer, a flow additive, and a colorant.

The block copolymer plasticizer, in combination with the linear block copolymer forms an elastic phase of the ink upon solidifying. The first plasticizer exhibits sufficiently low viscosity at elevated temperatures to permit ejection of the liquid ink from the printing apparatus at a desired operating temperature.

The present ink formulation provides numerous benefits over known solid hot-melt ink jet ink formulations. Principally, however, it has been found that the present hot-melt ink functions at operating temperatures of about 115° C., and thus provides significant advantages over known hot-melt ink formulations that require heating to temperatures of at least about 150° C.

In a preferred hot-melt ink formulation in accordance with the present invention the carrier is a fatty acid, preferably stearic acid. Preferably, the carrier is present in a concentration of about 45 percent to about 95 percent of the ink, and most preferably in a concentration of about 78 percent of the ink. Alternately, the carrier can be palmitic acid, myristic acid or the like.

In the preferred formulation, the first plasticizer is an aromatic hydrocarbon resin. Preferably, the first plasticizer is present in a concentration of about 0.1 percent to about 25 percent of the ink, and most preferably about 15 percent of the ink.

The preferred hot-melt ink includes a flow additive, preferably constituting a fluorinated polyolefin copolymer in a concentration of about 0.5 percent to about 10 percent of the ink, and more preferably about 1.0 percent of the ink.

Preferably, the block copolymer plasticizer is a polyvinyl acetal, and most preferably polyvinyl butyral in a concentration of about 0.5 percent to about 10 percent of the ink and more preferably in a concentration of about 1.0 percent of the ink.

In a most preferred ink formulation the linear block copolymer is a tri-block (A-B-A) copolymer. A preferred A-B-A copolymer is a styrene-butadiene-styrene block copolymer in a concentration of about 0.5 percent to about 5.0 percent of the ink, and more preferably in a concentration of about 1.0 percent of the ink. Alternately, the A-B-A copolymer can be a styrene-isoprene-styrene block copolymer.

In a preferred ink formulation, the colorant is a dye, preferably Orient Oil black BS. The Orient Oil black is present in a concentration of about 2.0 percent to about 8.0 percent, and preferably about 4.0 percent of the ink.

A method for producing indicia on a substrate includes the steps of heating to liquid a non-aqueous, solid hot-melt ink formulation to a temperature of not more than 130° C., ejecting the liquid from a printing device and allowing the liquid to solidify. Preferably, the heating is carried out to maintain the ink temperature not more than 120° C.

These and other features and advantages of the present invention will be apparent from the following detailed description, in conjunction with the appended claims.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

A hot-melt ink for use with an ink jet printing apparatus is a solid at room temperature and is a liquid at the operating or jetting temperature, namely at about 100° C. to about 130° C. The ink solidifies to a two-phase solid having an elastic phase and a crystalline phase.

The ink is formed from a carrier, a first plasticizer, a linear block copolymer, a block copolymer plasticizer, a flow additive and a colorant. The block copolymer plasticizer, in combination with linear block copolymer forms an elastic phase of the ink upon solidifying, and the first plasticizer exhibits sufficiently low viscosity at elevated temperatures to permit ejection of the liquefied ink from the printing apparatus at the desired operating temperature.

The ink formulation is non-aqueous; that is, it is not a water-based (or water-carried) formulation. Rather, in a preferred ink, the carrier is a fatty acid, preferably stearic acid present in a concentration of about 45 percent to about 95 percent of the ink, and the first plasticizer is an aromatic hydrocarbon resin polymer present in a concentration of about 0.1 percent to about 25 percent of the ink. Preferably, the flow additive is a fluorinated polyolefin copolymer present in a concentration of about 0.5 percent to about 10 percent of the ink, and the block copolymer plasticizer is a polyvinyl acetal, preferably polyvinyl butyral present in a concentration of about 0.5 percent to about 10 percent of the ink.

A preferred linear block copolymer is a tri-block copolymer. The tri-block copolymer can be styrene-butadiene-styrene block copolymer. Alternately, the tri-block copolymer can be styrene-isoprene-styrene block copolymer. Preferably, the linear block copolymer is present in a concentration of about 0.5 percent to about 5 percent of the ink. A preferred colorant is a dye. Most preferably, the dye is Orient Oil black present in a concentration of about 2 percent to about 8 percent of the ink.

In one exemplary ink, the fatty acid carrier is stearic acid. The stearic acid is present in a concentration of about 45 percent to about 95 percent of the ink. Preferably, the stearic acid is present in a concentration of about 70 percent to about 85 percent of the ink, and most preferably, in a concentration of about 78 percent of the ink. The stearic acid carrier is the vehicle by which the remaining components are carried in the solid and liquid phases to the substrate on which the ink is to jetted to produce print or, more generally, indicia.

As will be recognized by those skilled in the art, the stearic acid is a liquid at the operating temperature of about 100° C. to about 130° C. At ambient temperatures, however, the stearic acid is crystalline in nature. Stearic acid, $CH_3(CH_2)_{16}CO_2H$ is a white, solid or crystalline fatty acid. It has a melting point of about 71° C. to 72° C. Fatty acids such as palmitic acid and myristic acid, as well as other fatty acids can be used as will be recognized by those skilled in the art. All such fatty acids are within the scope and spirit of the present invention. In addition, in that the colorant, preferably Orient Oil black, is in a solution of a fatty acid, e.g., stearic acid, it is soluble in the fatty acid carrier.

The ink includes a first plasticizer that functions as a viscosity modifier. A present first plasticizer is an aromatic hydrocarbon resin, more specifically, a low molecular weight, non-polar resinous material derived from aromatic petroleum feedstock. A preferred first plasticizer is HERCURES®A10, previously commercially available from Hercules BV of The Netherlands, and presently commercially available from Eastman Corporation of West Elizabeth, Pa.

It has been found that the first plasticizer cooperates with, i.e., plasticizes, the stearic acid, thus modifying its viscosity. In a present ink formulation, the first plasticizer is present in a concentration of about 0 percent to about 25 percent, more preferably in a concentration of about 0.1 percent to about 25 percent, and most preferably, in a concentration of about 15 percent of the ink.

It has also been found that the use of the non-polar first plasticizer functions to reduce the overall viscosity of the ink formulation. That is, the first plasticizer exhibits a sufficiently low viscosity to permit "firing" the ink from an ink jetting device at lower operating temperatures, e.g., at temperatures of about 110° C. to about 130° C.

The linear block copolymer is a tough rubbery material that provides the physical strength characteristics to the solidified ink. It was previously thought that the linear block copolymer could not be present, that is incorporated into the ink formulation, at a sufficiently high concentration to provide the necessary physical characteristics, e.g., strength, to the dried ink formulation. It has, however, been found that the use of a plastic polymer (e.g., a hydrocarbon polymer, more fully discussed below, and referred to herein as the block copolymer plasticizer) in conjunction with a higher concentration of the block copolymer permits the use of the higher block copolymer concentrations, sufficient to provide these desired characteristics.

In a present ink formulation, the linear block copolymer is a tri-block copolymer. One tri-block copolymer is a styrene-butadiene-styrene copolymer, or an A-B-A copolymer. Preferably, the tri-block copolymer is present in a concentration of about 0.5 percent to about 5.0 percent of the ink. More preferably, the tri-block copolymer is present in a concentration of about 1.0 percent of the ink. In a current ink formulation, the tri-block copolymer is KRATON® D1101 U, commercially available from Kraton Polymers of Houston, Tex.

It is contemplated that other linear block copolymers of the AB-A type can be used for the present ink composition.

For example, it is contemplated that the B block can include, for example, polyisoprene and the like. These other B block polymers will be recognized by those skilled in the art and are within the scope and spirit of the present invention.

The block copolymer plasticizer functions as a second or supplemental plasticizer to plasticize the block copolymer (rather than the carrier). In much the same manner it also acts as a viscosity modifier. The block copolymer plasticizer is a short chain hydrocarbon having a low viscosity that dries to form a film. A preferred block copolymer plasticizer is polyvinyl acetal. In a present ink formulation, the block copolymer plasticizer is a polyvinyl butyral resin formed by reacting polyvinyl alcohol and butyraldehyde. The block copolymer plasticizer tends to plasticize and thus make "workable" the block copolymer, while at the same time forms a flexible film as it dries to further enhance the mechanical properties of the solidified ink.

In a present formulation, the block copolymer plasticizer is a polyvinyl butyral commercially available from Wacker Polymer Systems GmbH & Co. KG (Wacker-Chemie GmbH) of Munich, Germany, as PIOLOFORM® BN18 resin. In the present formulation, the block copolymer plasticizer is present in a concentration of about 0.5 percent to about 10 percent, and most preferably, in a concentration of about 1.0 percent of the ink.

The flow additive, in addition to promoting flow, that is enhancing the flow characteristics of the liquefied ink as it flows subsequent to jetting from the printing device, also promotes adhesion of the solidified ink to the substrate. To this end, a preferred flow additive has a low surface energy, in its liquid state, to achieve these results. Without being bound by theory, it is believed that the flow additive achieves these goals by fully migrating to the boundaries of the solidified ink. As such, it has also been found that the use of the flow additive provides a high gloss and "weatherability" to the dried ink. That is, the flow additive provides resistance to humidity and other potentially adverse environmental conditions.

In a current ink formulation, the flow additive is a solvent soluble fluoroolefin copolymer containing pendant hydroxyl groups. An exemplary fluoroolefin copolymer is FLU-ONATE® K-703, commercially available through the website www.chemizen.com The flow additive is present in a concentration of about 0.5 percent to about 10 percent of the ink and preferably in a concentration of about 1.0 percent of the ink.

It is also believed that polyesters and polyamides, both individually and in combination can be substituted for the block copolymer plasticizer and the flow additive, also individually and in combination. In fact, it has been found that ink formulations in which polyesters and polyamides are substituted for the block copolymer plasticizer and the flow additive exhibit superior flow characteristics. In addition, it was found that the solidified ink produced good (high) gloss and hardness characteristics.

As discussed above, a present ink formulation uses a colorant of oil black. A preferred oil black is Orient Oil black BS. The Orient Oil black is in a solution of, for example, stearic acid. This dye-type colorant is thus stable at elevated temperatures, that is at operating temperatures. This is due to its being "carried" in a solution that is the same as or at least compatible with (soluble in) the overall ink carrier, which, in the preferred formulation is stearic acid. In a present formulation, the oil black is present in a concentration of about 2.0 percent to about 8.0 percent and preferably about 4.0 percent of the ink.

It has been found that the present ink formulation provides numerous benefits over known solid hot-melt inkjet ink formulations. Principally, however, it has been found that the present hot-melt ink functions at operating temperatures of about 100° C. to about 130° C. and more preferably at temperatures of about 115° C. This is unlike known hot-melt ink formulations that require heating to temperatures of at least about 150° C.

Those skilled in the art will clearly recognize and appreciate the benefits that are achieved using these lowered operating temperatures. For example, less energy is required for operation as a result of lowered temperatures. As will also be appreciated, the adverse effects on the substrate that are reduced or eliminated can be substantial. Moreover, reduced operating temperatures typically result in less maintenance and general wear and tear on the printing equipment. All of these benefits generally result in lowered operating costs, increased equipment operating time, and generally increased printing equipment reliability.

A method for producing indicia on a substrate includes the steps of heating to liquid the hot-melt ink, to a temperature of not more than about 130° C., ejecting the liquid from a printing device, such as an ink jet printing device and allowing the liquid to solidify. The heating is carried out to preferably maintain the ink temperature no more than 120° C.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A hot-melt ink for use with an ink jet printing apparatus, the ink being a liquid at about 1000° C. to about 130° C. and solidifying to a two-phase solid having an elastic phase and a crystalline phase, the ink consisting essentially of:

stearic acid present in a concentration of about 45 percent to about 95 percent of the ink;

an aromatic hydrocarbon resin first plasticizer present in a concentration of about 0.1 percent to about 25 percent of the ink;

a tri-block copolymer present in a concentration of about 0.5 percent to about 5.0 percent of the ink;

polyvinyl butyral in a concentration of about 0.5 percent to about 10 percent of the ink;

a fluorinated polyolefin copolymer present in a concentration of about 0.5 percent to about 10 percent of the ink; and a colorant present in a concentration of about 2.0 percent to about 8.0 percent of the ink, wherein the polyvinyl butyral, in combination with tri-block copolymer forms an elastic phase of the ink upon solidifying, and wherein the aromatic hydrocarbon resin exhibits sufficiently low viscosity at elevated temperatures to permit ejection of the liquid ink from the printing apparatus.

2. The hot-melt ink in accordance with claim 1 wherein the tri-block copolymer is a styrene-butadiene-styrene block copolymer.

3. The hot-melt ink in accordance with claim 1 wherein the tri-block copolymer is a styrene-isoprene-styrene block copolymer.

4. The hot-melt ink in accordance with claim 1 wherein the colorant is a dye.

5. A method for producing indicia on a substrate comprising the steps of:

heating to liquid a non-aqueous, solid hot-melt ink formulation to a temperature of not more than 130° C. said ink formulation including stearic acid present in a concentration of about 45 percent to about 95 percent of the ink, an aromatic hydrocarbon resin first plasticizer present in a concentration of about 0.1 percent to about 25 percent of the ink, a tri-block copolymer present in a concentration of about 0.5 percent to about 5.0 percent of the ink, polyvinyl butyral in a concentration of about 0.5 percent to about 10 percent of the ink, a fluorinated polyolefin copolymer present in a concentration of about 0.5 percent to about 10 percent of the ink and a colorant present in a concentration of about 2.0 percent to about 8.0 percent of the ink, the polyvinyl butyral, in combination with tri-block copolymer forming an elastic phase of the ink upon solidifying, wherein the aromatic hydrocarbon resin exhibiting sufficiently low viscosity at elevated temperatures to permit ejection of the liquid ink from the printing apparatus;

ejecting the liquid from a printing device; and allowing the liquid to solidify.

6. The method for producing indicia in accordance with claim 5 wherein the liquid is heated to a temperature of not more than 120° C.

* * * * *